US012424080B2

(12) United States Patent
Thibault

(10) Patent No.: US 12,424,080 B2
(45) Date of Patent: Sep. 23, 2025

(54) CONFIGURABLE SECURITY SYSTEM

(71) Applicant: Universal Electronics Inc., Scottsdale, AZ (US)

(72) Inventor: Thomas Thibault, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 17 days.

(21) Appl. No.: 18/469,244

(22) Filed: Sep. 18, 2023

(65) Prior Publication Data

US 2024/0005775 A1 Jan. 4, 2024

Related U.S. Application Data

(62) Division of application No. 17/569,320, filed on Jan. 5, 2022, now Pat. No. 11,798,397, which is a division of application No. 17/172,902, filed on Feb. 10, 2021, now Pat. No. 11,227,482.

(51) Int. Cl.
*G08B 25/00* (2006.01)
*G08B 13/22* (2006.01)

(52) U.S. Cl.
CPC ........... *G08B 25/008* (2013.01); *G08B 13/22* (2013.01)

(58) Field of Classification Search
CPC ...... G08B 25/008; G08B 13/22; G08B 13/08; G08B 13/189; G08B 25/14
See application file for complete search history.

(56) References Cited

U.S. PATENT DOCUMENTS

| | | | |
|---|---|---|---|
| 5,900,806 A | 5/1999 | Issa | |
| 6,198,389 B1 | 3/2001 | Buccola | |
| 2016/0379456 A1 | 12/2016 | Nongpiur | |
| 2018/0102044 A1* | 4/2018 | Lamb | G08B 29/04 |
| 2019/0096202 A1* | 3/2019 | Seelman | G08B 21/0415 |
| 2019/0213857 A1 | 7/2019 | Ghourchian | |
| 2019/0244511 A1* | 8/2019 | Krishnamoorthy | G08B 29/185 |
| 2019/0304289 A1 | 10/2019 | Sol | |
| 2020/0064784 A1* | 2/2020 | Steiner | G01S 13/68 |
| 2020/0119940 A1 | 4/2020 | Dawes | |
| 2021/0287464 A1 | 9/2021 | Moore | |
| 2022/0058941 A1 | 2/2022 | Lamb | |

OTHER PUBLICATIONS

Extended Search Report from European application No. 22753195.1, dated Apr. 29, 2024, 10 pp.

Int. Search Report and Written Opinion issued on PCT application No. PCT/US22/15593, dated Feb. 28, 2022, 10 pages.

Office Action from EP application No. 22753195.1, dated Jan. 21, 2025, 7 pp.

* cited by examiner

*Primary Examiner* — Quan Zhen Wang
*Assistant Examiner* — Rajsheed O Black-Childress
(74) *Attorney, Agent, or Firm* — Greenberg Traurig, LLP

(57) ABSTRACT

Systems, methods and apparatus are described to selectively monitor a portion of a premises by a security system. A security system may contain a central security monitoring device in communication with a plurality of security sensors, and central security monitoring device may receive a command to actively monitor a first portion of a premises monitored by the security system, and in response to receiving the command, cause one or more security alerts to occur when an alarm signal is received from a security sensor located in the first portion of the premises, while ignoring alarm signals received from security sensors located in other portions of the premises.

15 Claims, 7 Drawing Sheets

CONFIGURABLE SECURITY SYSTEM

CROSS-REFERENCE TO RELATED APPLICATIONS

The present application is a divisional of U.S. patent application Ser. No. 17/569,320, filed on Jan. 5, 2022, which is a divisional of U.S. patent application Ser. No. 17/172,902, filed on Feb. 10, 2021, now U.S. Pat. No. 11,227,482.

BACKGROUND

Field of Use

The present application relates to the field of home security. More specifically, the present application relates to arming and disarming security systems.

Description of the Related Art

Security systems for homes and businesses are commonplace in the United States and many other countries. Such security systems typically comprise a central controller, or "panel" installed in a home or business and a number of security sensors, such as door/window sensors, motion sensors, glass break sensors, etc. The sensors report to the central controller when a violation occurs, i.e., a door or window is opened, motion is detected, etc. In response, when the system is armed, the central controller may then cause a loud siren inside or outside the home or business to sound, and/or notify a remote monitoring center of the violation, which may dispatch the police, firefighters and/or other first responders if necessary.

One of the disadvantages of typical security systems is that they are somewhat cumbersome to arm and disarm. Typically, a keypad is installed near an entry door, and when a person leaves a premises, the person must enter a numeric code into the keypad to arm the system. Usually, the person is permitted a short time to exit the premises before the security system arms itself, meaning that if a door or window is opened, or motion is sensed, for example, the panel may cause a local siren to sound and/or contact a remote monitoring center. Upon return, the person must enter the numeric code in order to disarm the system but must do so within a relatively short time period, such as 30 seconds. During this time, the keypad may emit a series of tones that indicate that the system has detected an intrusion and will sound the siren and/or contact the remote monitoring center if the proper code isn't entered by the time the time period expires. The tones may cause the person to experience a significant amount of stress to enter the correct code.

Security systems may also be armed when a person is at home or inside his or her business. In this mode of operation, commonly referred to as an "armed-home" mode, the panel only monitors perimeter sensors, such as door/window sensors, to determine if an intruder has entered the home or business. Motion sensors are not monitored, so that people already inside the home when the system is armed do not trigger a response by the panel.

Oftentimes, a person at home or in an office building would like to actively monitor only a portion of a home or business when the person is inside and alone. For example, a person at home in a two-story house, where a security system monitors the first story, may want to go upstairs to take a nap, or to take a shower, for example. At other times, a person might want additional security when the person is inside a home or business by having the security system respond to certain motion detectors inside the home or business.

SUMMARY

The embodiments described herein relate to methods, systems, and apparatus for selectively monitoring a portion of a premises by a security system. In one embodiment, a method is described, comprising selectively monitoring a portion of a premises by a security system, the security system comprising a central security monitoring device in communication with a plurality of security sensors, comprising, receiving a command by a central security monitoring device to actively monitor a first portion of a premises monitored by the security system, and in response to receiving the command, causing one or more security alerts to occur when a first alarm signal is received from a first security sensor located in the first portion of the premises, and ignoring alarm signals received from security sensors located in a second portion of the premises.

In another embodiment, a central security monitoring device is described, in communication with a plurality of security sensors distributed in a premises, forming a security system, for selectively monitoring a portion of the premises, comprising a sensor interface for receiving alarm signals from the plurality of security sensors and from a central security monitoring device, a network interface for communicating with local or remote networked devices, a non-transitory memory for storing processor-executable instructions, and a processor, coupled to the sensor interface, the network interface and the memory, for causing the central security monitoring device to receive, by the processor via the sensor interface, a command to actively monitor a portion of the plurality of sensors, and in response to receiving the command, cause, by the processor via the network interface, one or more security alerts to occur when a first alarm signal is received from a first security sensor located in the first portion of the premises, and ignore, by the processor, any alarm signals received from security sensors located in a second portion of the premises.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
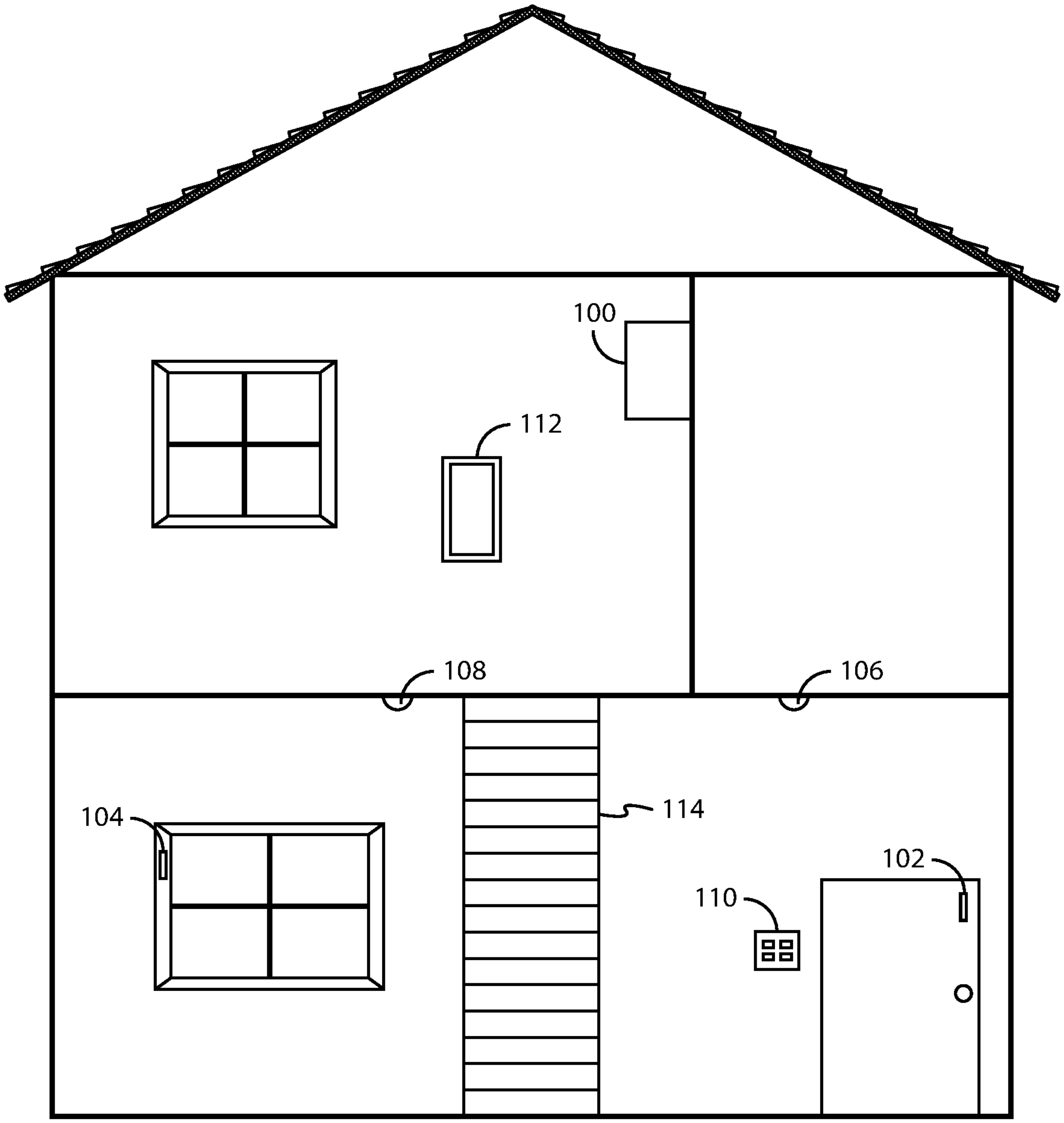
FIG. 1 is simple, front, cutaway view of a two-story home utilizing a security system.

Methods and apparatus are described herein for temporarily and/or selectively arming and disarming security systems. For example, a person alone inside a two-story home may want to go upstairs to take a shower but want to feel safe in doing so. If the first floor of the home is monitored by a security system comprising a plurality of door and window sensors and one or more motion sensors inside, the person may wish to arm the security system for only a predetermined time while the person takes a shower upstairs, and automatically disarm the security system after the shower has been taken. In this embodiment, the person may wish to arm the security system for 45 minutes, enough time to take a shower, get dressed and come downstairs. The security system may be automatically disarmed after either a predetermined time (i.e., 45 minutes) or upon an occurrence of a predetermined event, so that when the person returns downstairs, the security system is not triggered.

In a similar embodiment, a person alone in a two-story home monitored by a security system on both floors may wish to temporarily arm only a portion of a security system, i.e., trigger the security system when a signal is received from any sensor downstairs while ignoring signals received from sensors located upstairs, while the person performs a task.

In another example, a person alone in a large one or multi-story home monitored by a security system may want maximum security in every area, except for an area that the person currently occupies. For example, the security system may be placed into a "roaming" mode of operation, where the security system actively monitors all sensors in the home except for any motion or occupancy sensors in an area where the person is located. For example, a person may be in the kitchen, cooking dinner. During this time, the security system actively monitors all perimeter sensors of the home and any motion or occupancy sensors in all areas of the home except the kitchen. After cooking dinner, the person may move to a dining room to eat. In response, the security system automatically stops actively monitoring any motion or occupancy sensors in the dining room and begins actively monitoring any motion or occupancy sensors in the kitchen. Similarly, when the person is finished with dinner, the person may walk through a long hallway to a living room to watch TV. As the person leaves the dining room, the security system stops actively monitoring any motion or occupancy sensors in the hallway and begins actively monitoring any motion sensors or occupancy sensors in the dining room. As the person enters the living room, the security system stops actively monitoring any motion or occupancy sensors in the living room and begins actively monitoring the motion sensors or occupancy sensors in the hallway. In this way, a person can feel especially safe inside his or her home, knowing that both perimeter and interior sensors are being monitored while the person goes about his or her business inside the home.

For purposes of discussions herein, the term "perimeter sensor" means any device used to monitor and report a state, physical condition, attribute, status, or parameter of a perimeter of a home. Typical perimeter sensors comprise security door sensors, (including garage door tilt sensors and outdoor gate sensors), security window sensors, outdoor motion detectors, glass break sensors, and cameras. The term "interior sensor" means any device that can detect movement and/or occupancy inside an area in a home, such as security motion detectors, occupancy sensors, and cameras. The term "sensors" and "detectors" may be used interchangeably. Both perimeter sensors and interior sensors are well-known, commonly comprising battery-powered devices that transmit wireless alerts (referred to herein as "alarm signals") when an activity is detected, such as when a door or window is opened, or when motion or occupancy is detected. The term "armed-home" refers to a security system mode of operation where the system actively monitors only perimeter sensors, used when one or more people or inside a monitored premises. The term "armed-away" refers to a security system mode of operation that actively monitors both perimeter and interior sensors, used when there is no one inside a monitored premises. The term "temporarily arm" means to actively monitor a sensor or area of a premises for only a predetermined time period ("temporary mode of operation"), before reverting to a previous mode of operation before entering the temporary mode of operation or defaulting to a predetermined mode of operation, such as "off". The term "actively monitored" or "actively monitoring" refers to monitoring either an area of a premises or monitoring one or more security sensors that are located in an area, to determine if an intrusion, motion or occupancy has occurred. Any area or sensor being "actively monitored" will trigger one or more "security alerts" by the security system, such as to cause a loud, local siren to sound and/or to alert a remote monitoring facility of a potential intrusion. "Passively monitoring" means waiting for and receiving alarms signals, and not causing an external event to occur but, rather, causing one or more other actions to occur, such as sounding a chime, notifying a user via smart device 112 that an alarm signal was received, or recording the date and time of an event associated with each alarm signal received. "Triggering" or "to trigger" a security system means to cause a security system to perform one or more security alerts, usually by opening a door or window, or moving or occupying an actively monitored area of a premises. The term "monitored" or "monitoring" means waiting to receive alarm signals from security sensors. The term "security system" may refer to central security monitoring device 100 (described later herein), to central security monitoring device 300 (also described later herein), respectively, either alone or in combination with any number of security sensors.

FIG. 1 is simple, front, cutaway view of a two-story home utilizing a security system, the security system comprising central security monitoring device 100 in communication with a door sensor 102, a window sensor 104, a motion detector 106 and a staircase sensor 108, each of the sensors located on the first floor of the home. In this example, no sensors are located on the second story of the home. In other words, the security system monitors only the first floor, but not the second floor. While the security system comprises only four sensors, in practice, many more door, window and motion sensors are used, and the principles described herein are applicable in such cases where additional sensors are used.

Sensors 102, 104, 106 and 108 typically communicate wirelessly with central security monitoring device 100 using one of many, common wireless protocols, such as Zwave, Zigbee, WiFi, or proprietary protocols such as those used by major home security equipment manufacturers, typically in the "sub-gig" frequency range. Alarm signals are generated by the sensors when an activity occurs in proximity to the sensors, such as a door or window opening, motion detected, occupancy detected, etc. Each alarm signal typically comprises an identification code that uniquely identifies the sensor to central security monitoring device 100, in many embodiments, the identification code comprises a serial number assigned to each sensor during the manufacturing process.

Central security monitoring device 100 may be implemented as a dedicated device, such as a professional security "panel", or a do-it-yourself "hub", "base station" or similar nomenclature, located within the home, where typically all functions of the security system are processed internally. Alternatively, or in conjunction with a dedicated device inside the home, the functionality of the security system may be performed by a remote computer server, coupled to a gateway, router, or hub within the home, via a wide-area network such as the Internet, as is well-known in the art. Functionality of central security monitoring device 100 comprises monitoring all, or only a subset, of sensors within or external to a home, and causing one or more security alerts to occur upon receipt of an alarm signal received from any actively-monitored sensors when the security system is in an armed-home mode (i.e., actively monitoring only perimeter sensors such as door and window sensors), an armed-away mode (i.e., actively monitoring all sensors) or, in this embodiment, a temporary mode of operation (i.e., actively monitoring all of sensors in a security system for either a predetermined time period or until a predetermined event occurs). In the case of implementation by a remote computer server, a local-area network inside a home (such as a WiFi network) may relay alarm signals received in the form of RF signals from the sensors, convert the RF signals into data packets for transmission over a wide-area network, such as the Internet, to the remote computer. The remote computer may then determine whether to cause one or more security alerts to occur, such as causing a siren inside a home to sound and/or contacting a remote monitoring facility, depending on the mode of operation that the security system is in.

Functionality of central security monitoring device 100 also typically comprises setup functionality, when the security system is first installed. This comprises a technician or other person programming central security monitoring device 100 to "learn" or "enroll" sensors into central security monitoring device 100, i.e., to introduce each sensor to central security monitoring device 100 so that central security monitoring device 100 can determine a number and type of sensors that form the security system. One or more security system "zones" may be defined to identify a particular sensor (i.e., door sensor 102) or two or more sensors that monitor a common area (i.e., all window sensors that monitor a living room). Each zone may be assigned a name and/or a number to make it easy to determine which sensor has been triggered. For example, if the front door is designated as zone one, an indicator on keypad 110 may flash, and/or an indication that zone 1 has been triggered may be displayed on personal communication device 110, i.e., a smartphone, wearable device, or other personal digital device, when the door is opened.

Keypad 110 is an electronic interface to central security monitoring device 100, allowing users to arm and disarm the security system (i.e. place the security system into an armed-home mode, armed-away mode, a temporary mode, or off), bypass certain zones (i.e., purposefully ignoring alarm signals sent by a sensor or multiple sensors in a zone), and other functions. Such keypads are well-known in the art.

Mobile device 112 comprises a mobile phone, wearable, portable computer, tablet computer, or some other computing device configured to communicate with central security monitoring device 100. Mobile device 112 may execute a software application or "app" that provides information to a user and allows a user to place the security system into different operating modes, receive alerts when a sensor is triggered, setup the security system, etc. The app may allow a user to temporarily arm all or a portion of the security system while a user occupies an unmonitored area of the home, such as upstairs in the present example.

Motion detector 106 monitors some or all of the area downstairs for the presence of motion but does not monitor for motion occurring on or near staircase 114. Staircase sensor 108 monitors staircase 114 or an area proximate to staircase 114 in order to detect the presence of a human being or to detect a human being that is ascending and/or descending staircase 114. In some embodiments, staircase sensor 108 is not used, but monitoring of staircase 114 is performed by motion detector 106, in addition to monitoring one or more other areas of a home. Staircase sensor 108 may comprise a motion detector, the same or similar to motion detector 106, an occupancy sensor, a camera, a beam interruption device, a pressure-sensitive sensor located on one or more of the steps of staircase 114 or some other device that can detect the presence of a person either on or near staircase 114, and in some embodiments, able to detect whether a person is ascending or descending staircase 114. In some embodiments, two of such interior sensors may be used to determine whether a person is ascending or descending staircase 114, for example, one pressure-sensitive sensor located on one step of staircase 114, and another located on another stop of staircase 114.

When a user is alone and downstairs in the home, and the security system is either off (i.e., in a disarmed mode of operation, not responding to any alarm signals from any of the sensors), or the in an armed-home mode (i.e., central security monitoring device 100 actively monitors window sensor 104 and door sensor 102, but not motion detector 106), the user may decide to go up staircase 114 to the second floor for a short period of time, for example 30 minutes, to take a shower. In order to feel safe as the person takes the shower, the person causes the security system to enter the temporary mode of operation, where central security monitoring device 100 actively monitors all of the sensors that are located downstairs for a predetermined amount of time, such as a typical time to perform a task, such as taking a shower, or upon the occurrence of a predetermined event, such as staircase sensor 108 detecting the presence of a person on staircase 114 or detecting that a person is descending (as opposed to ascending) staircase 114. In either case, detection of a person on or near staircase 114 or descending staircase 114, may be indicative to central security monitoring device 100 that the person has completed his or her task upstairs. In response, central security monitoring device 100 may cause the security system to revert to the same mode of operation that the security system was operating in before the system entered the temporary mode (in this case, the armed-home mode), or central security monitoring device 100 may cause the security system to enter a default mode of operation, such as "off".

Figure 2:
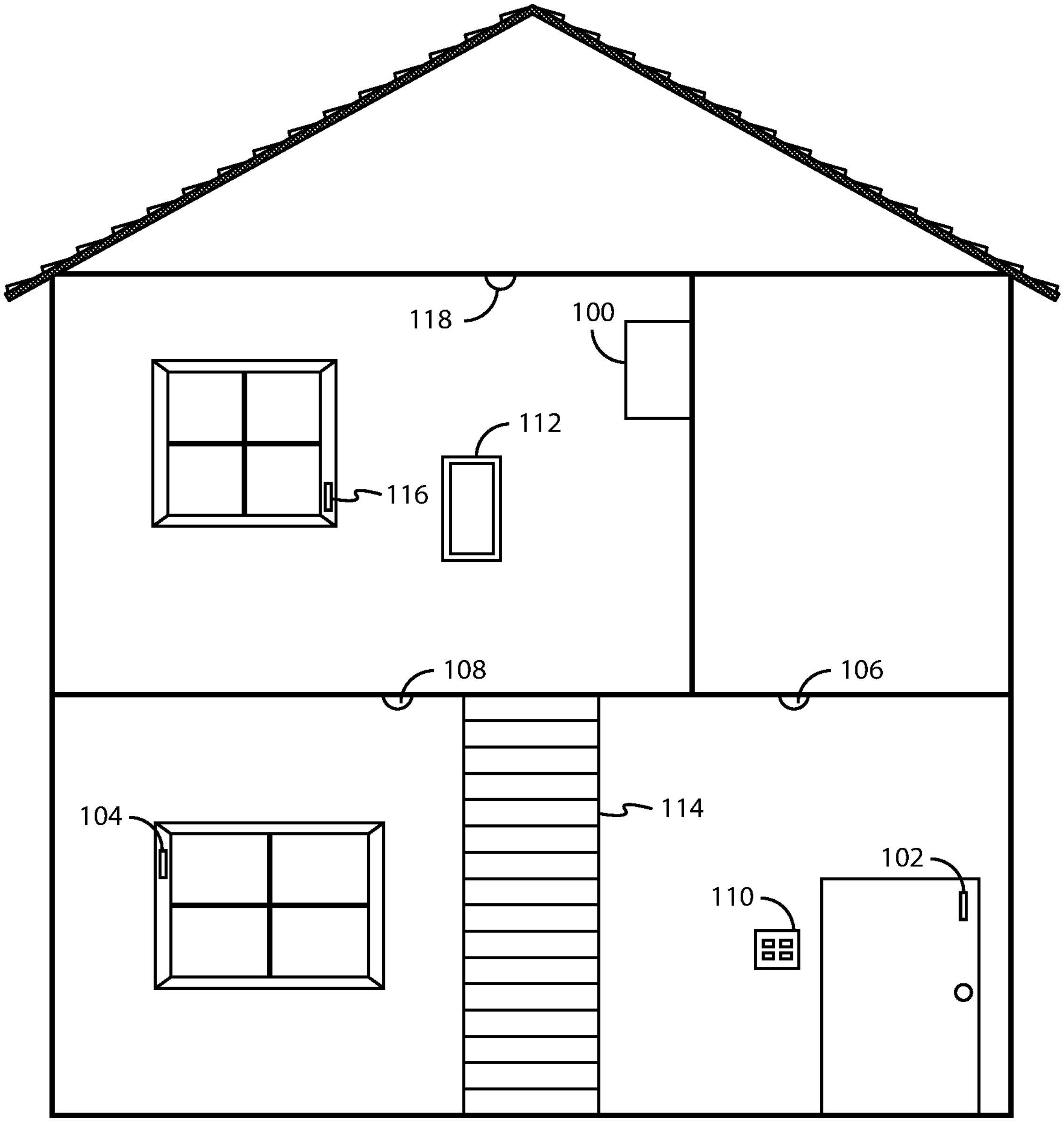
FIG. 2 is a simple, front, cutaway view of the two-story home shown in FIG. 1, with an addition of an upstairs window sensor and an upstairs motion detector.

FIG. 2 is a simple, front, cutaway view of the two-story home shown in FIG. 1, additionally comprising upstairs window sensor 116 and upstairs motion detector 118. Window sensor 116 monitors an upstairs window while motion detector 118 monitors for movement, or occupancy, of an area upstairs. While only a single window sensor and a single motion detector is shown in this example, in practice, other window sensors may monitor additional windows upstairs, and more than one motion detector may be used to monitor various areas or rooms upstairs.

In this embodiment, a person may cause the security system to enter into a selective mode of operation, where only a selected area of a home is actively monitored. For example, a person alone in the home on the first floor may wish to go upstairs to do laundry. The security system may be off or in an armed-home mode. Before, during or after going upstairs, the person causes the security system to enter into the selective mode of operation, using either keypad 110 or mobile device 112, where central security monitoring device 100 begins actively monitoring all of the sensors downstairs and passively monitoring the sensors upstairs. In some embodiments, staircase sensor 108 is passively monitored during this time. The security system remains in the selective mode of operation until either a predetermined time has expired or a predetermine event occurs, such interior staircase sensor 108 detecting the presence of a person on or near staircase 114 or detecting that a person is descending (as opposed to ascending) staircase 114. In either case, detection of a person on staircase 114 or descending staircase 114 may be indicative to central security monitoring device 100 that the person has completed his or her task upstairs. In response, central security monitoring device 100 may cause the security system to enter the same mode of operation that the security system was in before the system entered the temporary mode (in this case, the armed-home mode), or central security monitoring device 100 may cause the security system to enter a default mode of operation, such as "off".

Figure 3:
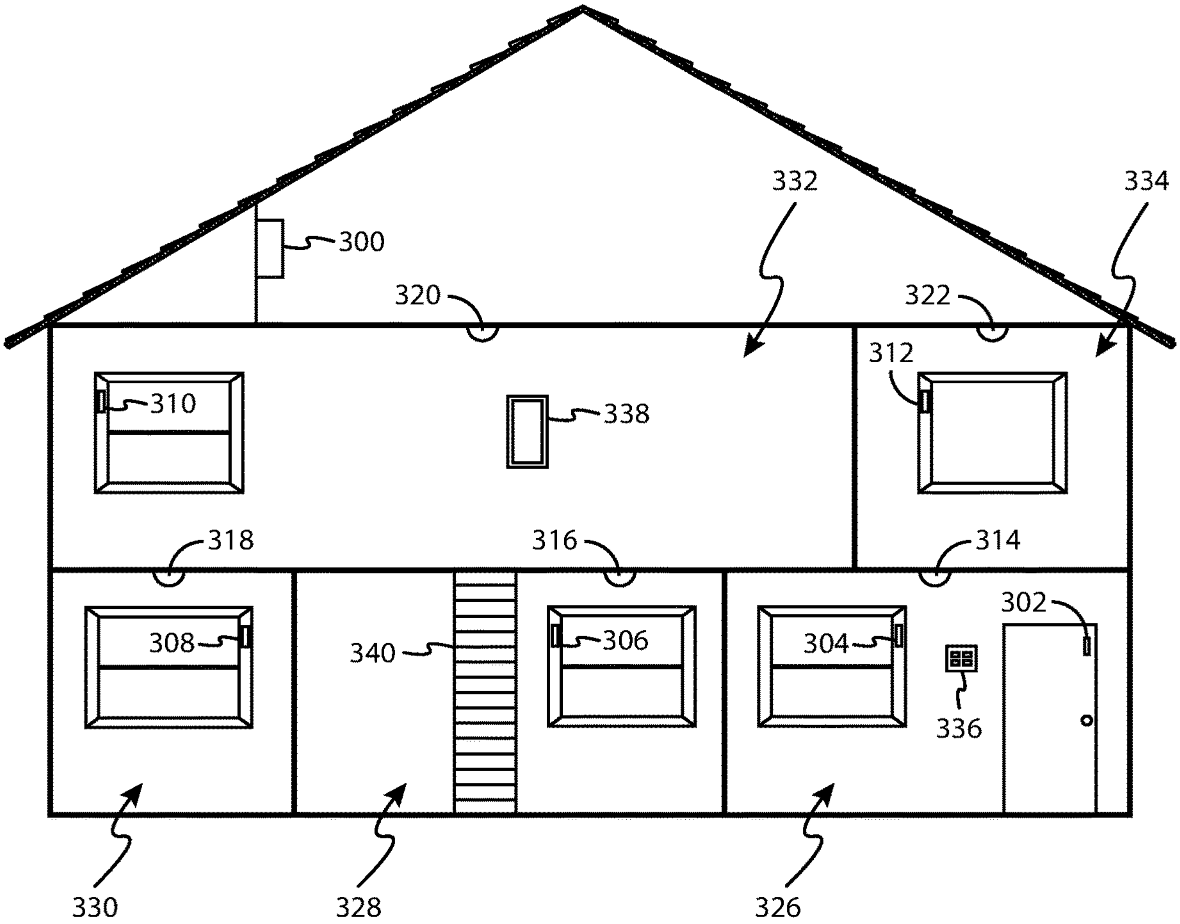
FIG. 3 is a simplified, side, cutaway view of a different home than the home shown in FIGS. 1 and 2, having a security system with the same or similar components as the security system as shown and described with respect to FIGS. 1 and 2.

FIG. 3 is a simplified, side, cutaway view of a different home than the home shown in FIGS. 1 and 2, having a security system with the same or similar components as the security system as shown and described with respect to FIGS. 1 and 2. The security system in this home comprises central security monitoring device 300, mounted in an attic, in communication with door sensor 302 that monitors a front entry door of the home, window sensors 304, 306 and 308 that each monitor a respective window downstairs, window sensors 310 and 312 that each monitor a respective window upstairs, motion/occupancy detectors 314, 316, 318, 320 and 322 that monitor for the presence or movement of people in entry room 326, hallway 328, kitchen 330, bedroom 332 and office 334, respectively. Central security monitoring device 300 is the same or similar to central security monitoring device 100, performing the same or similar functionality as described above. All of the sensors shown in FIG. 3 are the same or similar to the sensors shown in FIGS. 1 and 2, performing the same functions, respectively, such as monitoring of doors and windows, and monitoring for the presence or movement of people.

In one embodiment, central security monitoring device 300 receives a wireless command from either keypad 336 or smart device 338 in response to a person inside the home desiring the security system to enter into a roaming mode of operation. In the roaming mode of operation, central security monitoring device 300 actively monitors all perimeter sensors (i.e., sensors 302, 304, 306, 308, 310 and 312) and all interior sensors, except for any interior sensors where a person is located. For example, if keypad 336 was used to place the security system into the roaming mode of operation, central security monitoring device 300 actively monitors all of the perimeter sensors and all of the interior sensors except for detector 314. Central security monitoring device 300 may begin actively monitoring a motion/occupancy detector when another motion/occupancy detector reports motion and/or occupancy, indicating that the person has moved to a different room. In one embodiment, central security monitoring device 300 stops actively monitoring any perimeter sensors that are associated with the reporting detector. For example, if a person is in entry room 326, detector 314 sends signal(s) to central security monitoring device 300 indicating movement or occupancy in entry room 326 and, in response, central security monitoring device 300 stops actively monitoring detector 314, window sensor 304 and door sensor 302.

As another example, if a person is inside the home shown in FIG. 3 is in kitchen 330, and the security system is in an armed-home mode of operation, the person may wish to have additional security protection as the person moves through the home. The person may send a command from smart device 338 to central security monitoring device 300 for central security monitoring device 300 to enter into the roaming mode of operation. In response, central security monitoring device 300 begins actively monitoring all perimeter sensors and interior sensors except for detector 318 when central security monitoring device 300 receives one or more signals from detector 318 indicating movement or occupancy in proximity to detector 318. If the user leaves kitchen 330 and walks into hallway 328, detector 316 detects the person entering hallway 328 and sends one or more alarm signals to central security monitoring device 300 indicative of movement and/or occupancy in hallway 328. Central security monitoring device 300, in response, begins actively monitoring detector 318 and stops actively monitoring detector 316. The person may then wish to go upstairs using stairway 340. As the person walks up stairway 340 and into bedroom 332, central security monitoring device 300 begins to actively monitor detector 316 and stops actively monitoring detector 320. In this way, in the roaming mode, both perimeter and interior sensors are actively monitored while allowing a person to move around a home without triggering the security system.

It should be understood that in some embodiments, the roaming mode may be used when more than one person is inside a home. In this case, central security monitoring device 300 receives signals from more than one detector and stops actively monitoring any detector that reports movement and/or occupancy. However, if movement or occupancy is sensed by some other detector, other than the ones that are not currently being actively monitored, central security monitoring device 300 may cause one or more security alerts to occur.

Figure 4:
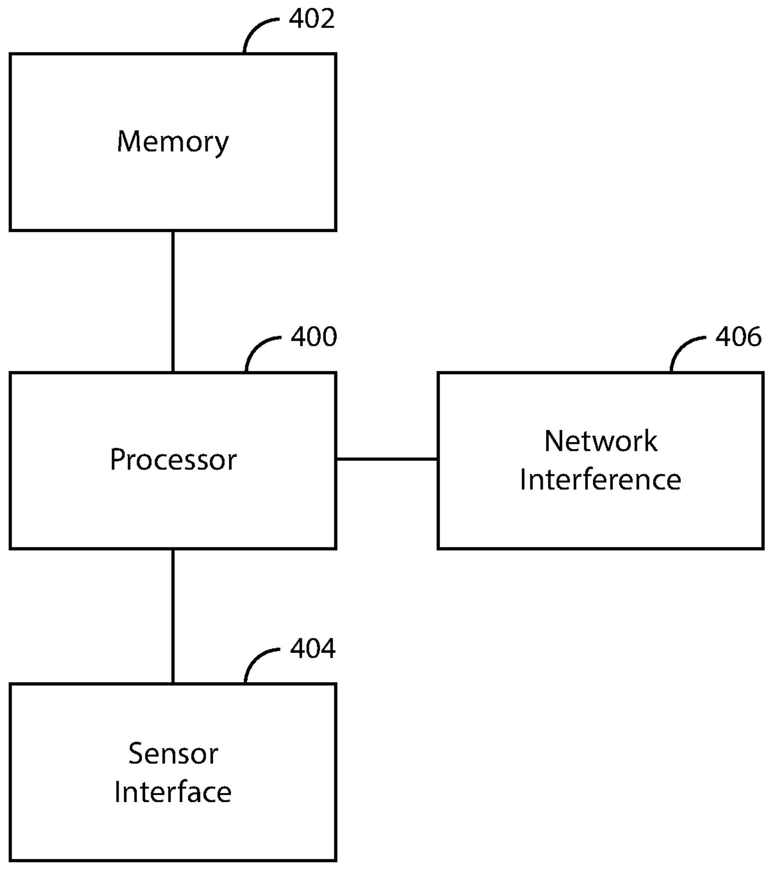
FIG. 4 is a functional block diagram of one embodiment of central security monitoring device as shown in FIG. 1 and FIG. 3.

FIG. 4 is a functional block diagram of one embodiment of central security monitoring device 100 or central security monitoring device 300 as shown in FIG. 1 and FIG. 3, respectively. Specifically, FIG. 4 shows processor 400, memory 402, sensor interface 404, and network interface 406. It should be understood that the functional blocks may be connected to one another in a variety of ways, and that not all functional blocks necessary for operation of central security monitoring device 100 or central security monitoring device 300 are shown (such as a power supply), for purposes of clarity.

Processor 400 is configured to provide general operation of central security monitoring device 100 or central security monitoring device 300 by executing processor-executable instructions stored in memory 402, for example, executable code. Processor 400 typically comprises a general purpose processor, although any one of a variety of microprocessors, microcomputers, and/or microcontrollers may be used alternatively, selected based on factors such as cost, processing power, onboard memory capacity, etc.

Memory 402 is coupled to processor 400, comprising one or more non-transitory information storage devices, such as RAM, ROM, EEPROM, UVPROM, flash memory, or other type of electronic, optical, or mechanical memory device. Memory 402 is used to store processor-executable instructions for operation of central security monitoring device 100 or central security monitoring device 300 as well as any information used by processor 400, such as zone information, sensor identification information, current or previous sensor status, information relating to the type, number, and location of sensors registered with central security monitoring device 100 or central security monitoring device 300, etc. It should be understood that reference to memory 402 may include references to more than one memory type or device, such as RAM memory for storing temporary information and flash memory for storing long-term information. In some embodiments, processor 400 may comprise volatile memory and/or non-volatile memory.

Sensor interface 404 is coupled to processor 400, comprising circuitry for allowing central security monitoring device 100 or central security monitoring device 300 to communicate with the various sensors, detectors and keypads that define a security system. The circuitry comprises transmitter circuitry and receiver circuitry, configured to operate at one or more popular "sub-gig" frequencies such as 900 MHz, 345 MHz, 433 MHz, or 319 Mhz, or other frequencies such as 2.4 Ghz and/or 5 Ghz, popular in WiFi networks. The circuitry is configured to operate in accordance with one or more wireless communication standards, such as Zwave, Zigbee, WiFi, etc. In some embodiment, sensor interface 404 may, additionally or alternatively, comprise circuitry necessary to communicate via electric wires. All of the above circuitry is well-known in the art.

Network interface 406 is coupled to processor 400, comprising circuitry for allowing central security monitoring device 100 or central security monitoring device 300 to communicate wirelessly or via wires with other local or remote networked devices, such as smart devices 112 and 338, computers, remote monitoring centers, etc. via one or more local or wide-area networks. A typical local-area network comprises a WiFi network, while typical wide-area networks comprise the Internet, cellular and/or satellite telephone networks, cellular and/or satellite data networks, POTS networks, etc. Network interface 406 may be used by processor 400 to send signals related to security alerts to external recipients, such as for sending a command to a local siren via a WiFi network, causing the siren to sound, or for sending a notification to a remote monitoring facility of a possible intrusion. It is also typically used to allow communications between mobile device 112 or 338 and central security monitoring device 100. For example, network interface 406 may pass information from smart device 112 or 338 to processor 400 to allow a user to designate certain sensors or zones as sensors or zones to actively monitor when the security system enters into various operating modes.

Figure 5:
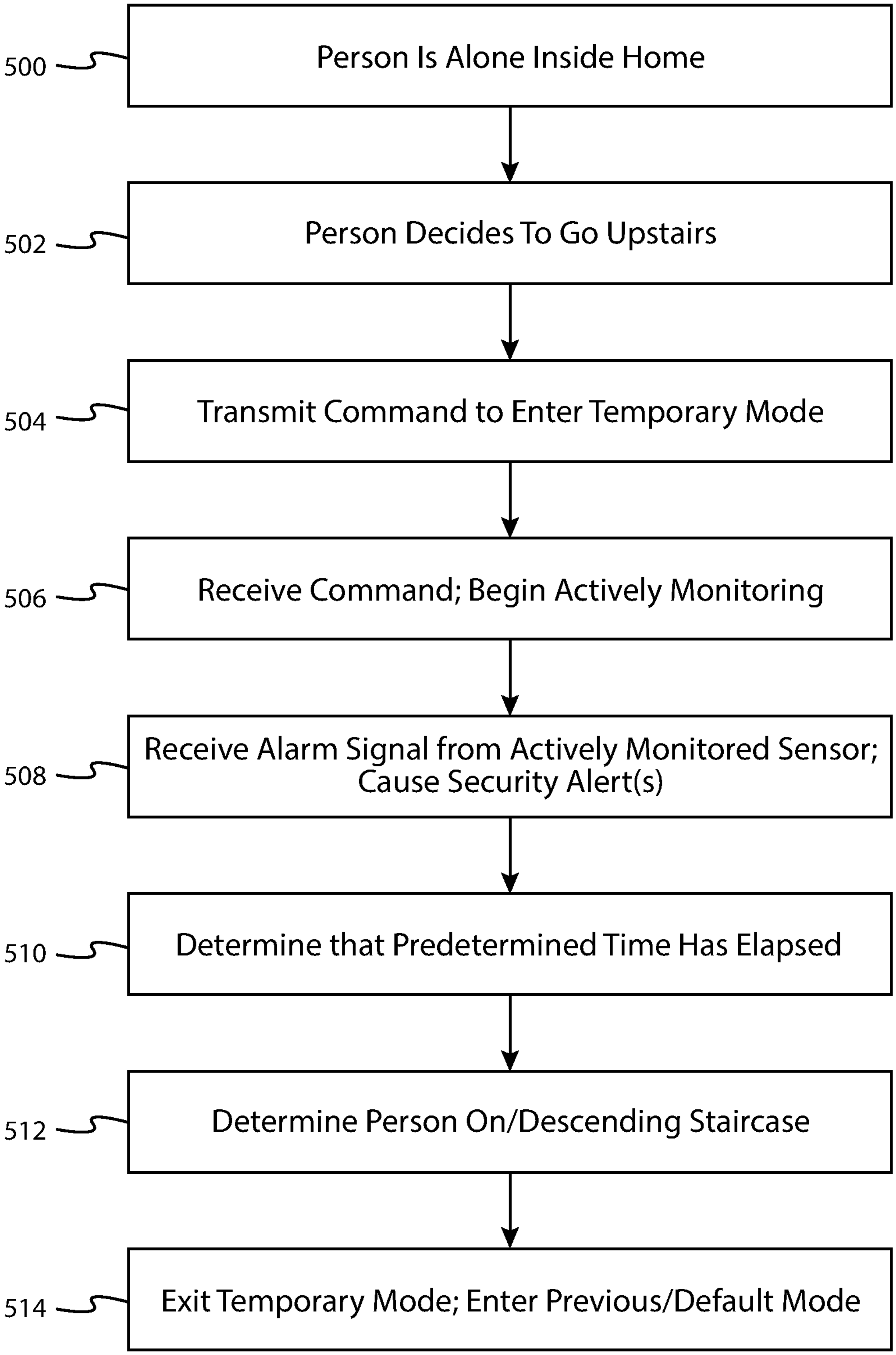
FIG. 5 is a flow diagram illustrating one embodiment of a method performed by the central security monitoring device shown in FIGS. 1-4, for temporarily arming a security system.

FIG. 5 is a flow diagram illustrating one embodiment of a method performed by central security monitoring device 100 for temporarily arming a security system. In the case of central security monitoring device 100 comprising a remote server or computer, steps have been omitted that describe transmission of signals over a wide-area network between central security monitoring device 100 and a local hub, gateway and/or router in a home. It should be understood that in some embodiments, not all of the steps shown in FIG. 5 are performed. It should also be understood that the order in which the steps are carried out may be different in other embodiments.

At block 500, a person is alone in a two-story home, such as the one depicted in FIG. 1. The home in FIG. 1 is partially protected by a security system, comprising central security monitoring device 100 in communication with door sensor 102, window sensor 104 and motion detector 106. In one embodiment, interior staircase sensor 108 is also part of the security system, used specifically for detecting the presence, and in some embodiments, a direction of travel, of a person on staircase 114. Of course, in most cases, the first floor of a home may have several other doors and windows each monitored by a door or window sensor, and such sensors are part of the security system and communicate with central security monitoring device 100. In the example shown in FIG. 1, the first floor of the home is monitored by the security system while the second floor is not.

When the person is inside the home, the security system may be either off or in an armed-home mode. When the security system is off, central security monitoring device 100 does not actively monitor any of the security sensors in the home, allowing the person to move about anywhere in the home and open doors and windows without causing the security system to generate a security alert. While in the armed-home mode, central security monitoring device 100 actively monitors all perimeter sensors (except ones that have not been bypassed), in this case door sensor 102 and window sensor 104, but does not actively monitor any interior sensors, such as detector 106 or staircase sensor 108, allowing the person to move about inside the home without triggering a security alert from the security system, but not to open any doors or windows without triggering a security alert.

At block 502, in one example, the person may be on the first floor of the home and decide to go upstairs via staircase 114, for example, to perform a task such as taking a shower, taking a nap, doing laundry, exercising or for some other reason, the person frequently intending to come back downstairs after performing the task. Alternatively, the person may already be upstairs.

At block 504, prior to going upstairs, the person may use keypad 110 or mobile device 112 to transmit a command to central security monitoring device 100, indicating that the person intends to go upstairs temporarily and for central security monitoring device 100 to enter the temporary mode of operation. In response to receiving the command, processor 400 begins actively monitoring the downstairs portion of the home, i.e., monitoring all of the downstairs perimeter security sensors and all of the downstairs interior sensors, in this example, door sensor 102, window sensor 104, and detector 106, for a predetermined amount of time and/or upon detection of a predetermined event. If staircase sensor 108 is used, central security monitoring device 100 does not actively monitor interior staircase sensor 108 but does monitor it to determine when the person has ascended and/or descended staircase 114. In the case of using keypad 110 to transmit the command, a predetermined key or sequence of keys is pressed by the person in order to invoke the command. In the case of mobile device 112, an "app" running on mobile device 112 causes mobile device 112 to transmit the command after the person provides user input, such as pressing a certain area of a touchscreen of mobile device 112.

In one embodiment, the person may enter a custom time period that the person believes he or she will be upstairs. For example, if the person is going to take a shower, and then dress, and then go downstairs, the person may enter a custom time period of 40 minutes into keypad 110 or smart device 112. The time period may then be appended to the command or transmitted separately to central security monitoring device 100.

In another embodiment, central security monitoring device 100 causes the security system to automatically enter the temporary mode of operation, from either the off mode or the armed-home mode, when processor 400 determines that the person is walking up staircase 414, i.e., after receiving an alarm signal from staircase sensor 108, or receiving an alarm signal from staircase sensor 108 with an indication that the person is ascending staircase 114. This allows the person to feel comfortable performing tasks upstairs without having to manually arm the security system via keypad 110 or smart device 112. As described above, the temporary mode of operation may be maintained for a predetermined time period, whereupon the security system may revert back to its previous mode of operation, i.e., to "off" or "armed-home", or a default mode, after the predetermined time period has expired. In another embodiment, the temporary mode of operation may be maintained until processor 400 receives an alarm signal from interior staircase sensor 108, indicating that the person is present, or indicating that the person is descending staircase 114.

In another embodiment, central security monitoring device 100 causes the security system to automatically enter the temporary mode of operation, from either the off mode or the armed-home mode, to monitor at least a portion of a home, when processor 400 determines that no motion or occupancy is sensed in a particular area or areas of a home for at least a predetermined time period. For example, if a person is downstairs inside the home, and goes upstairs, central security monitoring device 100 may begin monitoring an elapsed time from the last time that any alarm signals were from any of motion detectors located downstairs. When the elapsed time meets or exceeds the predetermined time, central security monitoring device 100 begins to actively monitor all of the sensors downstairs, until a predetermined event occurs, such as receiving an alarm signal from staircase sensor 108, indicating that the person who went upstairs is now coming downstairs. At this time, central security monitoring device 100 stops monitoring at least all the interior sensors located downstairs.

In one embodiment, where staircase sensor 108 does not provide an indication of a direction of travel when a person is detected on staircase 114, processor 400 may make one or more inferences of whether a person is ascending or descending staircase 114. For example, if processor receives a signal from keypad 110, instructing processor 400 to place the security system into the temporary mode of operation, processor 400 may infer that the person is ascending staircase 114 the first time that processor 400 receives an alarm signal from staircase sensor 108, and may additionally infer that the person is descending staircase 114 the next time that processor 400 receives an alarm signal from staircase sensor 108.

In another example, processor 400 may infer that the person is ascending staircase 114 when it detects the person downstairs, via one of the downstairs detectors, and then detects the person on staircase 114 via an alarm signal sent from staircase sensor 108, or by an alarm signal sent by an upstairs detector.

At block 506, processor 400 receives the command via sensor interface 404 and, in some embodiments, the custom time period and, in response, automatically begins actively monitoring a portion of the home, namely actively monitoring all of the security sensors downstairs. In one embodiment, processor 400 allows a predetermined time to elapse after receiving the command before beginning to actively monitor the downstairs security sensors, in order to give the person some time to go upstairs, for example, 30 seconds. In another embodiment, processor 400 waits a short time after receiving a signal from interior staircase sensor 108 that indicates that the person is traversing staircase 114, before beginning to actively monitor the security sensors downstairs, such as 10 seconds.

At block 508, if an alarm signal is received by processor 400 via sensor interface 404 from any of the security sensors downstairs, in some embodiments with the exception of staircase sensor 108, processor 400 causes one or more security alerts to occur, such as causing a loud siren (not shown) inside the home to sound and/or contacting a remote monitoring station (not shown), which may dispatch authorities to the home, if needed.

At block 510, processor 400 may determine that a predetermined time period has elapsed since receiving the command at block 506 or that the custom time period has elapsed, if one was provided by the person. The predetermined time period is stored in memory 402 and may be pre-programmed into central security monitoring device 100, in some embodiments, by the person or another user of the security system, and/or in other embodiments, during the manufacturing process of central security monitoring device 100. For example, the predetermined time period may be 30 minutes, allowing someone enough time to complete certain everyday tasks upstairs, such as showering, using a toilet, doing laundry, or some other common household task. The predetermined time period may be modified by a user of the security system, for example, by entering a new predetermined time period using the app running on mobile device 112, at any time.

In another embodiment, at block 512, alternatively or additionally to determining that a predetermined time period or the custom time period has elapsed, processor 400 determines that the person is descending staircase 114. In one embodiment, processor 400 receives a signal via sensor interface 404 from staircase sensor 108, indicating movement on staircase 414. In this embodiment, processor 400 infers that the movement is of the person upstairs, traversing staircase 114 after completing a task upstairs. In one embodiment, the signal from staircase sensor 108 comprises an indication of a direction of travel by whoever is on staircase 114. In this embodiment, processor 400 may initiate one or more security alerts when the indication indicates that someone is walking up staircase 114 and ignore the signal from staircase sensor 108 when the indication indicates that someone is walking down staircase 114 (inferring that the person who went upstairs a short while ago is the same person descending staircase 114). In an embodiment that utilizes both the predetermined/custom time period discussed with respect to block 510 and the detection of motion on staircase 114, if processer 400 receives the signal from staircase sensor 108, indicating someone is descending staircase 114, but the predetermined time period or the custom time period has not yet elapsed, processor 400 may assume that the person has completed his or her task upstairs early, i.e., before the predetermined time period or custom time period has expired, and stop actively monitoring at least the downstairs interior sensor(s), in this case detector 106.

In any case, at block 514, processor 400 exits the temporary mode of operation and either reverts back to the mode of operation just before entering the temporary mode of operation or enters a default mode of operation. For example, if the security system was in an armed-home mode of operation before entering the temporary mode of operation, processor 400 may cause the security system to enter the armed-home mode of operation once the predetermined time period or the custom time period as described in block 510 has expired, when processor 400 receives a signals from staircase sensor 108 that either a person is on staircase 114, or that a person is descending staircase 114, or a combination of both.

Figure 6:
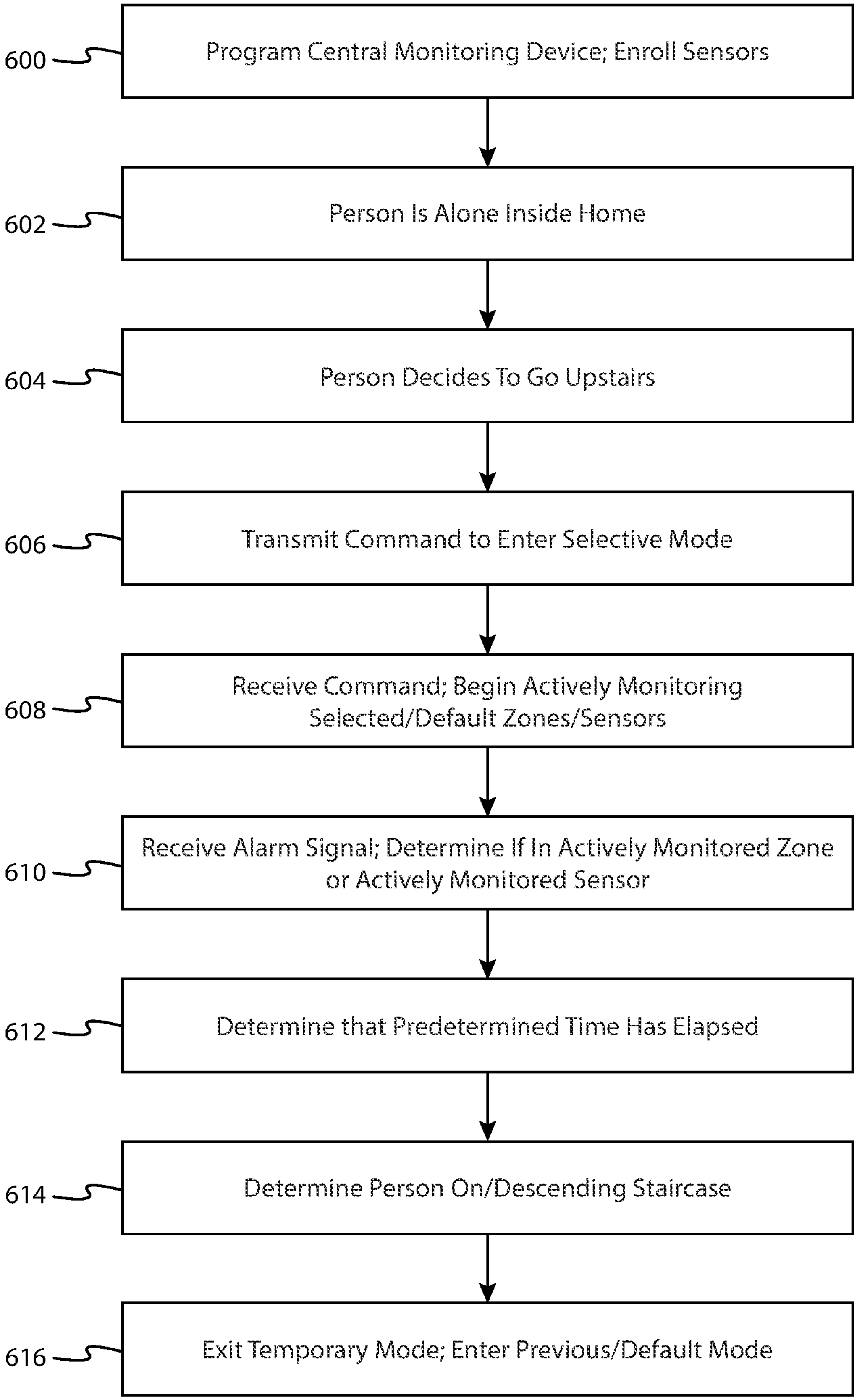
FIG. 6 is a flow diagram illustrating another embodiment of a method performed by the central security monitoring device shown in FIGS. 1-4 for selectively and temporarily arming a security system.

FIG. 6 is a flow diagram illustrating another embodiment of a method performed by central security monitoring device 100 for selectively arming a security system. In the case of central security monitoring device 100 comprising a remote server or computer, steps have been omitted that describe transmission of signals over a wide-area network between central security monitoring device 100 and a local hub, gateway and/or router in a home. It should be understood that in some embodiments, not all of the steps shown in FIG. 6 are performed. It should also be understood that the order in which the steps are carried out may be different in other embodiments.

At block 600, central security monitoring device 100 may be programmed by a homeowner or an installation professional to enter information pertaining to each sensor and detector in the security system. For example, each sensor is "learned" or "enrolled" into central security monitoring device 100 using techniques known in the art, typically identifying each sensor by a sensor type (such as door sensor, window sensor, motion detector, tilt sensor, glass break sensor, etc.) and a sensor identification code, typically each sensor's serial number. Each sensor may be assigned to a particular security "zone", each zone identifying a particular area of a premises. For example, "zone 1" can identify a home's front door, "zone 2" could identify a living room having three windows, each monitored by a respective window sensor, etc. All of the above information is stored by processor 400 in memory 402.

In one embodiment, each zone represents one room of a home. So, for example, in FIG. 2, zone 1 may define the upstairs area monitored by window sensor 116 and detector 118, while zone 2 may define the area downstairs, monitored by door sensor 102, window sensor 104, detector 106 and, in some embodiments, staircase sensor 108. In some embodiments, interior staircase sensor 108 is assigned to its own zone, in the case where the function of staircase sensor 108 is to monitor only staircase 114. After all of the sensors and detectors have been enrolled into central security monitoring device 100, processor 400 knows the location and type of each sensor in the security system.

In one embodiment, the homeowner or professional installer designates which of the security sensors, or security zones, to actively monitor, by default, when the security system is selectively armed or, conversely, an identification of security sensors, or zones, to ignore. For example, the homeowner or professional installer may designate door sensor 102, window sensor 104 and detector 106 as sensors to actively monitor when the security system is selectively armed. As another example, the homeowner or professional installer may designate "zone 2" as a zone to actively monitor when the security system is selectively armed, where zone 2 identifies a bedroom monitored by window sensor 116 and detector 118. This information is received by processor 400 and stored in memory 402.

At block 602, a person is alone in a two-story home, such as the one depicted in FIG. 2. The home in FIG. 2 is fully protected by a security system, comprising central security monitoring device 100 in communication with door sensor 102, window sensor 104, motion detector 106, window sensor 116 and motion/occupancy detector 118. In one embodiment, staircase sensor 108 is also part of the security system, used specifically for detecting the presence, and in some embodiments, a direction of travel, of a person on staircase 114. Of course, in most cases, both floors of a home may have additional doors and windows each monitored by a respective door or window sensor, and such sensors are part of the security system and communicate with central security monitoring device 100. In the example shown in FIG. 2, both floors of the home are monitored by the security system.

When the person is inside the home, the security system may be either off or in an armed-home mode. When the security system is off, central security monitoring device 100 does not actively monitor any of the security sensors in the home, allowing the person to move about anywhere in the home and open doors and windows without causing the security system to generate a security alert. While in the armed-home mode, central security monitoring device 100 actively monitors all perimeter sensors (except ones that have not been bypassed), in this case door sensor 102, window sensor 104, and window sensor 116, but does not actively monitor any interior sensors, such as detector 106, detector 118, and sometimes staircase sensor 108, allowing the person to move about inside the home without triggering one or more security alerts from the security system, but not to open any doors or windows without triggering one or more security alerts.

At block 604, in one example, the person may be on the first floor of the home and decide to go upstairs via staircase 114, for example, to perform a task, such as to take a shower, to exercise or for some other reason, often intending to come back downstairs after performing the task. Alternatively, the person may already be upstairs.

At block 606, prior to going upstairs, the person may use keypad 110 or mobile device 112 to transmit a command to central security monitoring device 100, indicating that the person intends to go upstairs and for central security monitoring device 100 to enter a selective mode of operation, where processor 400 begins actively monitoring a first portion of the premises, i.e., the area downstairs, monitored by the downstairs perimeter security sensors and the downstairs interior security sensors, in this example, door sensor 102, window sensor 104, and detector 106, for a predetermined amount of time and/or upon detection of a predetermined event, while ignoring alarm signals transmitted by security sensors in a second portion of the premises, i.e., the area upstairs monitored by window sensor 310 and detector 320. It should be understood that actively monitoring a first portion of the premises can mean actively monitoring any room, upstairs or downstairs, or multiple rooms. The term "ignoring" means that central security monitoring device 100 will not cause an external event to occur when it receives an alarm signal from a sensor that is not actively monitored. However, central security monitoring device 100 may cause a "chime" to sound, alert a user via smartphone 112 that an event has occurred, or store information pertaining to the alarm signal in memory 402, such as an identification of the sensor that transmitted the alarm signal, the time and day of transmission, the state of doors or windows (i.e., open/closed) when the alarm signal was received, etc. If staircase sensor 108 is used, central security monitoring device 100 may not actively interior staircase sensor 108, but may monitor it to determine when the person has ascended and/or descended staircase 114. In the case of using keypad 110 to transmit the command, a predetermined key or sequence of keys is pressed by the person in order to initiate the command. In the case of mobile device 112, an "app" running on mobile device 112 causes mobile device 112 to transmit the command after the person provides user input, such as pressing a certain area of a touchscreen of mobile device 112. In one embodiment, smart device 112 may display a map or floor plan of the home to the user, for a user to select which portion(s) of the home to actively monitor and/or which sections to disarm or ignore. Such selection is provided to central security monitoring device 100.

In one embodiment, the person may enter a time period that the person believes he or she will be upstairs. For example, if the person is going to take a shower, and then dress, and then go downstairs, the person may enter a custom time period of 40 minutes into keypad 110 or smart device 112. The custom time period may then be appended to the command or transmitted separately to central security monitoring device 100.

At block 608, processor 400 receives the command via sensor interface 404 or the network interface and, in some embodiments, the custom time period and/or the selected areas of the home to actively monitor/ignore and, in response, automatically begins actively monitoring one or more portion(s) of the home, in this example, actively monitoring all of the security sensors downstairs by default, as programmed into central security monitoring device 100 at block 600, or as identified in the command. In one embodiment, processor 400 allows a predetermined time to elapse after receiving the command before beginning to actively monitor the downstairs security sensors, in order to give the person some time to go upstairs, for example, 30 seconds. In another embodiment, processor 400 waits a short time after receiving a signal from staircase sensor 108 that indicates that the person is traversing staircase 114, before beginning to actively monitor the security sensors downstairs, such as 10 seconds.

At block 610, if an alarm signal is received by processor 400 via sensor interface 404, processor 400 determines whether the sensor that transmitted the alarm signal is located in the portion of the premises being actively monitored, such as in a defined zone or area, or is otherwise a sensor that is being actively monitored. To make this determination, processor 400 compares a sensor identification code in the alarm signal to a list of sensor security identification codes stored in the memory from the enrollment process at block 600, and determines that the sensor identification code in the alarm signal matches a sensor identification code stored in memory 402. Processor 400 then compares a location where the sensor is located, as identified in association with the identified sensor in memory 402, to an identification of the portion of the premises being actively monitored, and causes one or more security alerts to occur when the security sensor is located in the portion (zone/area) of the premises being actively monitored. The security alert may comprise processor 400 causing a loud siren (not shown) inside the home to sound and/or to contact a remote monitoring station (not shown), which may dispatch authorities to the home, if needed.

At block 612, processor 400 may determine that a predetermined time period has elapsed since receiving the command at block 506, or that the custom time period has elapsed, if one was provided by the person. The predetermined time period is stored in memory 402 and pre-programmed into central security monitoring device 100, in some embodiments, by the person or another user of the security system, and/or in other embodiments, during the manufacturing process of central security monitoring device 100. For example, the predetermined time period may be 30 minutes, allowing someone enough time to complete certain everyday tasks upstairs, such as showering, using a toilet, doing laundry, or some other common household task. The predetermined time period may be modified by a user of the security system, for example, by entering a new predetermined time period using the app running on mobile device 112.

In another embodiment, at block 614, alternatively or additionally to determining that a predetermined time period or the custom time period has elapsed, processor 400 determines that the person is descending staircase 114. In one embodiment, processor 400 receives a signal via sensor interface 404 from staircase sensor 108, indicating movement on staircase 414. In this embodiment, processor 400 infers that the movement is of the person upstairs, traversing staircase 114 after completing a task upstairs. In one embodiment, the signal from staircase sensor 108 comprises an indication of a direction of travel by whoever is on staircase 114. In this embodiment, processor 400 may cause one or more security alerts to occur when the indication indicates that someone is walking up staircase 114 (indicative of an intruder) and ignore the signal from staircase sensor 108 when the indication indicates that someone is walking down staircase 114 (inferring that the person who went upstairs a short while ago is the same person descending staircase 114). In an embodiment that utilizes both the predetermined/custom time period described with respect to block 510 and staircase sensor 114, if processer 400 receives the signal from staircase sensor 108, indicating someone is descending staircase 114, but the predetermined time period or the custom time period has not yet elapsed, processor 400 may assume that the person has completed his or her task upstairs early, i.e., before the predetermined time period or custom time period has expired, and stop actively monitoring at least the downstairs interior sensor(s), in this case detector 106.

In any case, at block 616, processor 400 exits the selective mode of operation and either reverts back to the mode of operation just before entering the selective mode of operation or enters a default mode of operation. For example, if the security system was in an armed-home mode of operation before entering the selective mode of operation, processor 400 would cause the security system to enter the armed-home mode of operation once the predetermined time period or the custom time period as described in block 510 has expired, when processor 400 receives a signals from staircase sensor 108 that either a person is on staircase 114, or that a person is descending staircase 114, or a combination of both.

Figure 7:
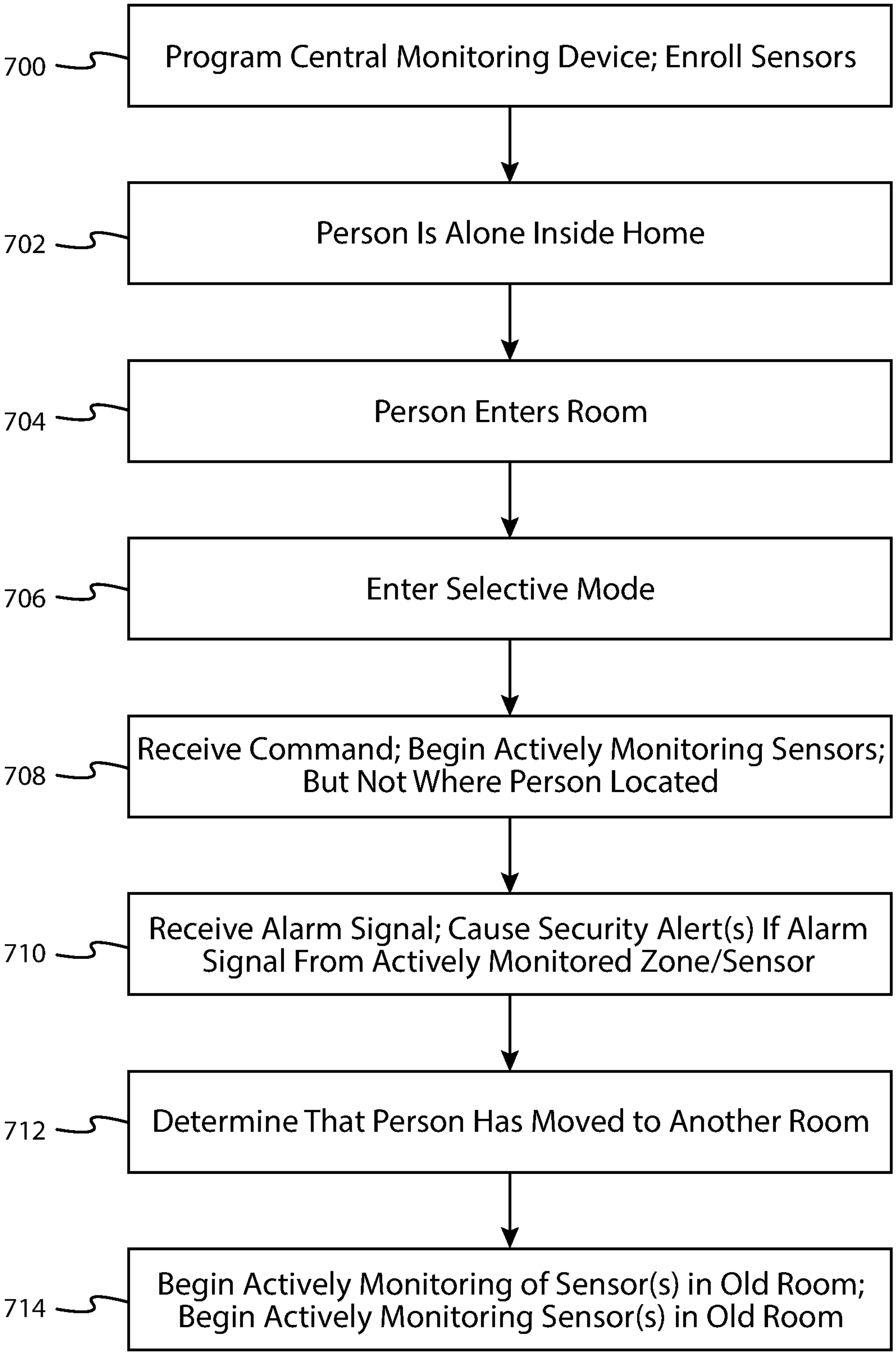
FIG. 7 is a flow diagram illustrating one embodiment of a method performed by the central security monitoring device shown in FIGS. 1-4, for selectively arming a security system.

FIG. 7 is a flow diagram illustrating another embodiment of a method performed by central security monitoring device 300 for selectively arming a security system. In the case of central security monitoring device 300 comprising a remote server or computer, steps have been omitted that describe transmission of signals over a wide-area network between central security monitoring device 100 and a local hub, gateway and/or router in a home. It should be understood that in some embodiments, not all of the steps shown in FIG. 7 are performed. It should also be understood that the order in which the steps are carried out may be different in other embodiments.

At block 700, central security monitoring device 300 is programmed by a homeowner or an installation professional to enter information of each sensor and detector in the security system. Typically, one or more security "zones" are defined, each zone identifying a particular area of a home. For example, "zone 1" can identify a home's front door, "zone 2" could identify a living room having three windows, each monitored by a respective window sensor, etc. for each sensor or detector, processor 400 may receive information such as a sensor or detector type, a serial number, and an indication as to which zone it is assigned. In one embodiment, each zone represents one room of a home. So, for example, in FIG. 3, zone 1 includes door sensor 302, window sensor 304 and detector 314, zone 2 includes window sensor 306, detector 316 and, in some embodiments, detector 324, etc. In some embodiments, detector 324 is assigned to its own zone, in the case where the function of detector 324 is to monitor only staircase 340. In one embodiment, processor 400 receives "association information" from the homeowner or installation professional that associates detectors located in rooms/zones adjacent to each other. For example, information can be received indicating that detector 314 and detector 316 are in adjacent rooms, or zones, from each other, detector 316 is in a room/zone adjacent to room/zone (i.e., kitchen) 330, room/zone (i.e., entry room) 326 and room/zone (i.e., bedroom) 332. Processor 400 stores these associations in memory 402 for later determining when a user is moving through a home.

At block 702, a person is alone in a two-story home, such as the one depicted in FIG. 3, however the discussion below is applicable to homes with any number of stories, including one story. The home in FIG. 3 is fully protected by a security system, comprising central security monitoring device 300, located in in attic, in communication with door sensor 302, window sensor 304, motion detector 316, window sensor 306, window sensor 308, window sensor 310, detector 320, window sensor 312 and detector 322. However, the discussion below is applicable as well to homes that are not fully protected by a security system, for example, a home having two stories, where the upper story is not protected by sensors of a security system, as depicted in FIG. 1. In one embodiment, detector 324 is also part of the security system, used specifically for detecting the presence, and in some embodiments, a direction of travel, of a person on staircase 114. Of course, in most cases, both floors of a home may have additional doors and windows each monitored by a respective door or window sensor, and such sensors are part of the security system and communicate with central security monitoring device 100. In the example shown in FIG. 3, both floors of the home are monitored by the security system.

When the person is inside the home, the security system may be either off or in an armed-home mode of operation. When the security system is off, central security monitoring device 300 does not actively monitor any of the security sensors in the home, allowing the person to move about anywhere in the home and open doors and windows without causing the security system to generate one or more security alerts. While in the armed-home mode, central security monitoring device 300 actively monitors all perimeter sensors (except ones that have not been bypassed), in this case door sensor 302, window sensor 304, window sensor 306, window sensor 308, window sensor 310, and window sensor 312, but does not actively monitor any interior sensors, such as detector 314, detector 316, detector 318, detector 320 and detector 322, and sometimes detector 324, allowing the person to move about inside the home without triggering one or more security alerts from the security system, but not to open any doors or windows without triggering one or more security alerts by the security system.

At block 704, a person enters entry room 336, either using the door in entry room 336 or from hallway 328. As a result, detector 314 transmits an alarm signal to central security monitoring device 300. Central security monitoring device 300 receives the alarm signal but ignores it if the security system is in the armed-home mode of operation or off. If the security system was in the armed-away mode, central security monitoring device 300 ignores the alarm signal if the person enters a security code into keypad 336 within a given time period, such as 30 seconds, or otherwise indicates to central security monitoring device 300 that the person is authorized to be inside the home.

At block 706, central security monitoring device 300 may automatically enter a selective mode of operation from the armed-away mode of operation after the person has correctly entered the security code into keypad 336, or otherwise authorized himself or herself to central security monitoring device 300. In another embodiment, the person may use keypad 336 or mobile device 312 to transmit a command to central security monitoring device 300 to enter the selective mode of operation. In the selective mode of operation, central security monitoring device 300 actively monitors all the sensors/detectors in a home, except for motion/occupancy detectors in a room where a person is located. In the case of using keypad 110 to transmit the command, a predetermined key or sequence of keys is pressed by the person to cause central security monitoring device 300 to enter into the selective mode of operation. In the case of mobile device 338, an "app" running on mobile device 338 causes mobile device 338 to transmit the command to enter into the selective mode of operation after the person provides user input, such as pressing a certain area of a touchscreen of mobile device 338.

At block 708, processor 400 receives the command via sensor interface 404 and, in response, begins actively monitoring a portion of the home, namely actively monitoring all the sensors/detectors except for any motion/occupancy detectors where the person is presently located. In the present example, the person is in entry room 326, therefore central security monitoring device 300 actively monitors all the sensors/detectors inside the home except for detector 314.

At block 710, if an alarm signal is received by processor 400 via sensor interface 404 from any of the actively-monitored zones/sensors/detectors, in some embodiments with the exception of detector 324, processor 400 causes one or more security alerts to occur, such as causing a loud siren (not shown) inside the home to sound and/or contacting a remote monitoring station (not shown), which may dispatch authorities to the home, if needed.

At block 712, processor 400 determines that the person in entry room 326 has moved to hallway 328.

In one embodiment, processor 400 determines that the person in entry room 326 has moved to hallway 328 when processor 400 receives an alarm signal from a detector in a room/zone where the person has not yet been detected, in this case detector 316, and no alarm signals have been received from an adjacent room/zone where the person had just been detected, in this case detector 314. When this occurs, at block 714, processor 400 stops actively monitoring any detectors located in the room/zone where the person just entered, in this case detector 316, and starts actively monitoring any detectors located in the room/zone where the person just left, in this case detector 314. In this embodiment, processor 400 may make use of the location associations of the detectors as stored in memory 402 and described in block 700, above, to ensure that movement/occupancy newly discovered in one room is adjacent to a room where movement/occupancy had been immediately occurring. For example, if an authorized person is located in hallway 328 in response to processor 400 receiving one or more alarm signals received from detector 316, and an alarm signal is then received from detector 322, processor 400 determines that detector 322 is not located in a room/zone adjacent to hallway 328 and, therefore, cause one or more immediate security alerts to occur.

In one embodiment, processor 400 may wait a predetermined time period after receiving an alarm signal from a detector in a different room (i.e., detector 316) than where the person is known to be (i.e., entry room 326) before causing one or more security alerts to occur, such as 20 seconds. However, if no alarm signals are received from the detector(s) in the room where the person is thought to be (i.e., detector 314) during the predetermined time period, processor 400 assumes that the person moved from one room (i.e., entry room 326) to another room (i.e., hallway 328), and so no security alerts are generated. In this embodiment, processor 400 may immediately cause one or more security alerts to occur when processor 400 receives an alarm signal from any perimeter sensor, or from any detector that is not in an adjacent room from where an authorized person is located. For example, processor 400 may wait the predetermined time to determine whether to initiate one or more security alerts when it receives an alarm signal from detector 316, knowing, from the detector associations in memory 402, that an authorized person was recently in entry room 326. For all other detectors, processor 400 may immediately initiate one or more security alerts upon receipt of an alarm signal from any one of the other detectors, again based on the detector associations stored in memory 402. If the authorized person is in hallway 328, processor 400 may wait the predetermined time period when it receives an alarm signal from either detector 314, 318 or 320, indicating that the authorized person is moving from hallway 328 to entry room 326, kitchen 330 or bedroom 332, respectively. For all other detectors, processor 400 may cause one or more security alerts to occur immediately upon receipt of an alarm signal from any other detector.

In another embodiment, one or more of the motion/occupancy detectors inside a home may comprise an ability to additionally detect directionality of a person moving into, or out of, a room. In this embodiment, when processor 400 receives an alarm signal from such a detector, the alarm signal comprises an indication of whether a person is moving into or out of a room. Thus, if processor 400 receives an alarm signal from detector 316, having such a capability, and the alarm signal indicates that a person is entering hallway 328, then processor 400 begins actively monitoring the detector associated with a room/zone where the person just came from, in this case detector 314, and stops actively monitoring any detectors in the room/zone where the person just entered, in this case detector 316 (and in some cases, detector 324).

Thus, as a person moves through a home, processor 400 stops actively monitoring any motion/occupancy detectors located where the person may be located, while actively monitoring all other motion/occupancy detectors in the home.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for selectively monitoring a premises by a security system comprising a central security monitoring device in communication with a plurality of security sensors, comprising:
- receiving while operating in a disarmed mode of operation a command by the central security monitoring device to actively monitor a first portion of a premises monitored by the security system; and
- in response to receiving the command:
- temporarily processing a first alarm signal received from a first security sensor located in the first portion of the premises;
- continuing in ignoring a second alarm signal received from a second security sensor located in a second portion of the premises;
- determining if a signal has been received from a third security sensor located in the premises; and
- in response to receiving the signal:
- returning to ignoring the first alarm signal received from the first security sensor located in the first portion of the premises; and
- continuing in ignoring the second alarm signal received from the second security sensor located in the second portion of the premises.

2. The method of claim 1, wherein processing the first alarm signal comprises:
- determining a sensor identification code from the first alarm signal; and
- causing one or more security alerts to occur when the security sensor identification code matches a security identification code stored in a memory identified as being located in the first portion of the premises.

3. The method of claim 1, wherein processing the first alarm signal comprises:
- identifying a first security system zone where the first security sensor is located; and
- causing one or more security alerts to occur when the first security sensor system zone identifies the first portion of the premises.

4. The method of claim 1, wherein ignoring the second alarm signal comprises:

determining a sensor identification code from the second alarm signal; and ignoring the second alarm signal when the security sensor identification code matches a security identification code stored in a memory identified as being located in the second portion of the premises.

5. The method of claim 1, further comprising:

determining that a pre-determined time has elapsed from when the command was received; and in response to determining that the pre-determined time has elapsed, causing the security system to enter into the disarmed mode of operation that the security system was operating in prior to receiving the command.

6. The method of claim 1, wherein the third security sensor monitors a staircase for the presence of a person.

7. The method of claim 1, further comprising:

determining an elapsed time from when the command was received;

determining that the elapsed time equals or exceeds a custom time period; and in response to determining that the elapsed time equals or exceeds the custom time period, causing the security system to enter into disarmed mode of operation that the security system was operating in prior to receiving the command.

8. A central security monitoring device in communication with a plurality of security sensors distributed in a premises, forming a security system, for selectively monitoring a portion of the premises, comprising:

a sensor interface for receiving alarm signals from the plurality of security sensors;

a network interface for communicating with local or remote networked devices;

a non-transitory memory for storing processor-executable instructions; and a processor, coupled to the sensor interface, the network interface and the memory, for causing the processor to:

receive, via the network interface, while operating in a armed-home mode of operation a command to actively monitor a first portion of the premises monitored by the security system; and in response to receiving the command:

temporarily process a first alarm signal received from a first security sensor located in the first portion of the premises;

continuing to ignore a second alarm signal received from a second security sensor located in a second portion of the premises;

determine if a signal has been received from a third security sensor located in the premises; and in response to receiving the signal:

returning to ignore the first alarm signal received from the first security sensor located in the first portion of the premises; and continuing to ignore the second alarm signal received from the second security sensor located in the second portion of the premises.

9. The central security monitoring device of claim 8, wherein the processor-executable instructions that cause the processor to process the first alarm signal comprise instructions that cause the processor to:

determine a sensor identification code from the first alarm signal; and cause one or more security alerts to occur when the security sensor identification code matches a security identification code stored in a memory identified as being located in the first portion of the premises.

10. The central security monitoring device of claim 8, wherein the processor-executable instructions that cause the processor to process the first alarm signal comprise instructions that cause the processor to:

identify a first security system zone where the first security sensor is located; and cause one or more security alerts to occur when the first security sensor system zone identifies the first portion of the premises.

11. The central security monitoring device of claim 8, wherein the processor-executable instructions that cause the processor to ignore the second alarm signal comprise instructions that cause the processor to:

determine a sensor identification code from the second alarm signal; and ignore the second alarm signal when the security sensor identification code matches a security identification code stored in a memory identified as being located in the second portion of the premises.

12. The central security monitoring device of claim 8, wherein the processor-executable instructions comprise further instructions that cause the processor to:

determine that a pre-determined time has elapsed from when the command was received; and in response to determining that the pre-determined time has elapsed, cause the security system to enter into the armed-home mode of operation that the security system was operating in prior to receiving the command.

13. The central security monitoring device of claim 8, wherein the processor-executable instructions comprise further instructions that cause the processor to:

receive, via the sensor interface, a further signal from a fourth security sensor after receiving the signal from the third security sensor; and upon receiving the further signal:

cause the security system to enter into a disarmed mode of operation, wherein in the disarmed mode of operation, alarm signals from any of the plurality of security sensors are ignored.

14. The central security monitoring device of claim 8, wherein the third security sensor monitors a staircase for the presence of a person.

15. The central security monitoring device of claim 8, wherein the processor-executable instructions comprise further instructions that cause the processor to:

determine an elapsed time from when the command was received;

determine that the elapsed time equals or exceeds a custom time period; and in response to determining that the elapsed time equals or exceeds the custom time period, cause the security system to enter into the armed-home mode of operation that the security system was operating in prior to receiving the command.

* * * * *